United States Patent Office 3,552,917
Patented Jan. 5, 1971

3,552,917
RECLAMATION OF THE CHROMIUM CONTENT FROM WASTE SLUDGES CONTAINING SOLID BARIUM CHROMATE
Charles O. Weiss, Princeton, N.J., assignor to M & T Chemicals Inc., New York, N.Y., a corporation of Delaware
No Drawing. Filed Mar. 28, 1969, Ser. No. 811,639
Int. Cl. C01g *37/12*
U.S. Cl. 23—145          7 Claims

ABSTRACT OF THE DISCLOSURE

A process is provided for recovering the chromium content from waste sludge produced from the separation of the sludge as precipitated solids from the waste effluent streams of metal finishing processes, the chromium content of the sludge being in the form of barium chromate. The above is achieved by forming an aqueous slurry of the sludge, adding sulfuric acid thereto, agitating the resulting admixture for a period of time at ambient temperature, separating the insolubles therefrom, adding to the filtrate from the separation an amount of a carbonate selected from the group consisting of $Ca^{+2}$, $Sr^{+2}$, $Ba^{+2}$, and $Pb^{+2}$ to precipitate out a substantial portion of the sulfate ion from the solution, again separating the insolubles from the reacting environment, adding to the filtrate of the second separation step strontium carbonate to precipitate out the remaining sulfate ion, and separating the insolubles from the reacting environment to obtain a solution containing all the $CrO_3$ content from the initial extraction.

---

Generally speaking, this invention relates to a process for removing the chromium content from waste sludge. More particularly, this invention relates to a process for recovering substantially all of the chromium trioxide content from waste sludge produced from the separation of this sludge as precipitated solids from the waste effluent streams of metal finishing processes, substantially in the absence of the application of heat and/or the utilization of any evaporative techniques.

With the ever increasing, and very well known, problem of pollution of water caused by the vast industrial operations of our economy, there is a concern with the ways of reducing and/or eliminating pollution of waste effluent waters, and there is a corresponding concern with regard to economically useful methods for removal of toxic content of waste effluent so as to provide producers of such pollutants with means economically feasible for the removal of such pollutants in a manner so as to permit their operation to continue on a profitable basis. Therefore, commercial operators of metal processing plants must provide means for removing from their waste effluent waters resulting from their operations the pollutants caused by their operations, while at the same time at a cost which permits their continued operation on an economically profitable basis.

For example, chromates may be present from such industrial metal finishing operations in the effluent from certain rinses thereof. When such chromates are present, they are generally reduced to $Cr^{+3}$ before mixing with, for example, nickel-bearing rinse waters, and chromium, iron and copper are generally precipitated as the hydroxides thereof by high pH treatment with an alkali. These precipitated hydroxides are then removed in one form or another from the waste effluent streams so that the streams can be discharged into public waters and/or recirculated to the metal finishing operations for further use in the operation thereof.

As will be understood, further, the resulting separated sludges from the waste effluent waters contain certain metallic content which is valuable and if it can be separated from the sludge environment, certain of the metallic content is useful for recirculation back into certain metal finishing operations such as, for example, electroplating. In the latter, and specifically with respect to chromium plating, the chromium content of such sludges may be useful for recirculation back into the plating operation if it can be separated sufficiently from the sludge environment and is in sufficient purity for use as required, and as well known, in electroplating operations.

The problem arises, however, as in any reclamation procedure, that if the cost of reclaiming the metallic content from such sludge is too high, or if difficulties are presented in providing the equipment necessary for such reclamation operations, it is obvious that the operator thereof will obtain the substituents for his process from another source rather than attempt to reclaim the desired substituents from the waste from his operations in the first place. It is equally obvious, however, that if the metallic content can be recovered from the waste from his operations in an economic fashion, then the advantages are readily apparent not only from the fact that he can reutilize a certain portion of the operating substituents that he utilizes over and over again, but also from the fact that they are readily available at the site of his operation and result from the required adjunct to his metal finishing operations of separating the metallic toxic content from the waste of his operations.

As is well known, the bulk of non-proprietary plating solutions operate at a $CrO_3$–$H_2SO_4$ weight ratio of about 100:1. Therefore, in the chemical recovery of plating grade chromic acid, it is necessary to produce a material which is virtually free of sulfuric acid. In the past, attempts have been made to recover a plating grade chromic acid solution directly from used electroplating baths. With such an arrangement, however, there is sufficient chromic acid present to give a $CrO_3$–$H_2SO_4$ weight ratio of at least 100:1 even though complete removal of sulfate has not been attained. In utilizing either calcium carbonate and/or barium carbonate to remove excess sulfuric acid in such process, the large amounts of chromic acid present allow for the loss of substantial quantities of barium chromate in order to precipitate out the barium sulfate.

Further, attempts have been made in the past to isolate pure solid chromic acid, with such processes not relating directly to the recovery of the valuable chromium content from waste environments. Such processes included utilizing concentrated sulfuric acid solutions for crystallizing out a pure solid chromic acid product. As will be understood, and as well known in the art of solid chromic acid recovery, such processes, as noted above, require large volume uses of highly corrosive chemicals and the consequent use of expensive corrosion resistant processing equipment for the isolation and purification of solid chromic acid.

By contrast, and quite unexpectedly, it has now been found in accordance with this invention, that the chromium values contained in the sludge solids from waste effluent streams flowing from metal finishing operations can be recovered in a manner as to to make the chromium readily available for recirculating back through the metal processing operation and with such recovery being economically advantageous in that no high temperature procedures are required, relatively inexpensive evaporative equipment may be required, and with operating conditions such that no expensive corrosion-resistant processing equipment is required. The above is achieved merely because the process, in accordance herewith, requires relative dilute solutions (for example 50 g./l. $CrO_3$ and 80 g./l. $H_2SO_4$).

The above is achieved by forming an aqueous slurry of the sludge, adding sulfuric acid thereto, agitating the resulting admixture for a period of time and separating out the insolubles from the solution. Thereafter, to the filtrate of the preceding separation an amount of carbonate is added to precipitate out a substantial portion of the sulfuric acid from the solution. To the filtrate of this second separation is added an additional quantity of a second carbonate to precipitate out the remaining sulfate, thus leaving a filtrate solution containing all of the $CrO_3$ content from the initial extraction step. As noted above, all of the steps involved herein require no temperature application, and relatively inexpensive evaporative procedures, it at all. Further, in accordance herewith, the various operating solutions involved are sufficiently dilute so as to not require any special corrosion-resistant equipment. In addition, and most importantly, the process herein enables the operator of metal finishing operations who is required to remove the toxic metallic content from his waste effluent to utilize the sludges obtained therein in a useful fashion. For example, certain advantageous procedures are known such as that disclosed and taught in U.S. Pat. 3,371,034 to Richards, for example, for removing the undesirable metallic content from such waste effluent streams. However, the resulting sludge obtained from such operations must be disposed of. The process, in accordance herewith, offers such operators a choice other than mere disposal.

Accordingly, it is one object of this invention to recover the chromium plating values from the solid barium chromate-containing solids in the waste sludge separated from effluent streams flowing from metal plating operations. In addition, it is a further object of this invention to obtain such recovery with much less need for expensive evaporative conditions and in the absence of high temperature operating conditions.

It is a further object of this invention to produce such reclamation of chromium content from waste sludge in the presence of relatively dilute solutions so as to eliminate the requirement of expensive corrosion-resistant equipment, and it is an additional object of this invention to produce such chromium values in solutions sufficiently free of sulfuric acid for recirculation back into the metal processing operations from which the waste sludge was taken in the first place, and in a manner which is satisfactorily and economically attractive for commercial scale operations.

With the foregoing and additional objects in view, this invention will be described in more detail and other objects and advantages will be apparent from the following description and appended claims.

Before describing this invention in more detail, it may be well to note that this invention has been found applicable to a wide variety of carbonates for use in the initial carbonate extraction step, such as, for example, calcium carbonate, strontium carbonate, barium carbonate and lead carbonate. For example, satisfactory results have been achieved in accordance herewith and under satisfactorily and economically attractive conditions in commercial scale operations by first forming an aqueous slurry of the sludge ad adding a stoichiometric quantity of sulfuric acid thereto. The resulting admixture containing solid barium chromate is agitated for a period of time at ambient temperature in order to dissolve out the desired chromium values from the sludge. The insolubles resulting from this initial extraction are filtered off and a stoichiometric quantity of one of the carbonates noted above is added to the filtrate from the initial reaction to precipitate out a substantial portion of the sulfate ion from the solution. The insolubles from this second extraction step are filtered off leaving a filtrate containing all of the $CrO_3$ values from the initial extraction and some sulfuric acid. To the filtrate from this second filtration and separation is added a second carbonate to precipitate out the remaining sulfate ion, followed by a third filtration thus leaving a filtrate solution containing all of the $CrO_3$ values from the initial extraction in a dilute solution substantially free of sulfuric acid, with such solution being an appropriate raw material for recirculation back into a metal finishing operation, such as chromium electroplating, for example.

In considering generally the conditions for achieving the most enhanced results in connection herewith, which conditions are more specifically set forth below, one may note that satisfactory separation of all of the $CrO_3$ content from the initial sludge is achieved by utilizing stoichiometric quantities of sulfuric acid and carbonate in the first two reactions of the process, in accordance herewith, with an excess of the second carbonate being utilized in the third reaction step.

A preferred cycle of operation in accordance herewith for recovering the chromium content from waste sludges containing solid barium chromate as noted herein includes forming an aqueous slurry of the sludge, and adding a stoichiometric quantity of sulfuric acid thereto and agitating the resulting admixture for a period of time at ambient temperature. The resulting barium sulfate precipitate is filtered off leaving a filtrate solution containing the original chromium content and excess sulfuric acid. To this solution is added a stoichiometric quantity of a carbonate selected from the group consisting of calcium, strontium, barium and lead, and preferably calcium carbonate, to precipitate out a substantial portion of the sulfate ion from the solution. The resulting precipitate is filtered off, leaving a filtrate solution containing a small portion of the remaining sulfuric acid plus the chromium content from the initial extraction. To this second filtrate is added strontium carbonate, preferably at 50% or more in excess of stoichiometric quantity to separate out the remaining sulfuric acid in the filtrate from the second filtration noted above. The insolubles from this third extraction step are filtered out, thus leaving a solution containing all the $CrO_3$ content from the initial extraction step.

As purely illustrative of the results achieved in accordance herewith, one may note the following example. It is to be understood, however, that this example is being presented with the understanding that it is to have no limiting character on the broad disclosure of the invention as generally set forth herein and as directed to men skilled in the art.

EXAMPLE

In this example, a representative sludge was prepared of a 55 kilogram sample of a mixture of $BaCrO_4$ (40%) and $BaCO_3$ (60%). This mixture was slurried with sufficient water to give a readily stirrable mixture. To the slurry was added 25.1 kilograms of $H_2SO_4$ (13.9 l.), and the admixture volume was adjusted to about 85 l. The mixture was agitated with no external heating for 2½ hours. The insolubles were then filtered off and the cake washed with several portions of water until the solution analyzed 5.5 g./100 ml. of $CrO_3$ and 7.8 g./100 ml. of $H_2SO_4$. The solution was then charged with 8.0 kilograms of $CaCO_3$ and agitated at room temperature for about 10 minutes. The insolubles were filtered off and the cake washed as described above to give a solution volume of about 115 l. This solution still contained 2.0 kilograms of $H_2SO_4$, and this solution in turn, was charged with 4.5 kilograms of $SrCO_3$ and agitated at room temperature for about 15 minutes. The insolubles were filtered off and the cake washed as described above to produce a final volume of 130 l. The resulting solution contained no $H_2SO_4$ and virtually all the $CrO_3$ obtained in the initial extraction.

As will be seen from the above example, the process in accordance herewith is effective for obtaining all of the chromium content from a slurried mixture containing barium chromate solids and with the solution obtained having substantially no sulfuric acid contained therein, thus making the final solution from the process as described herein particularly appropriate as a raw material for recirculation into a chromium electroplating process.

Accordingly, and as will be apparent from the foregoing, there are provided, in accordance herewith, methods for recovering the chromium plating values from the solid barium chromate-containing solids in the waste sludge separated from effluent streams flowing from metal plating operations, and in a manner so as to obtain such recovery in the absence of any high temperature operating conditions with reduced need for expensive evaporative equipment, and in the presence of relatively dilute solutions for carrying out the various extraction steps so as to eliminate the requirement of expensive corrosion-resistant equipment. In addition, the methods in accordance herewith provide for resulting solutions containing the chromium values in accordance herewith sufficiently free of sulfuric acid for recirculation back into the metal processing operations from which the waste sludge was taken in the first place, and in a manner which is highly advantageous commercially.

While the methods herein disclosed form preferred embodiments of this invention, this invention is not limited to those specific methods, and changes can be made therein without departing from the scope of this invention which is defined in the appended claims.

What is claimed is:

1. A process for obtaining the chromium content from waste sludges containing barium chromate solids in the absence of the application of heat and evaporation, the steps which comprise forming an aqueous slurry of said sludge, admixing and reacting sulfuric acid with said sludge, agitating said admixture for a period of time sufficient to precipitate out barium sulfate, separating the precipitate formed from said agitating step to obtain a first solution, combining said first solution with a carbonate selected from the group consisting of calcium carbonate, strontium carbonate, barium carbonate, lead carbonate and mixtures thereof to separate out said sulfuric acid from said first solution in a second admixing and reacting step, separating the insolubles from said second reacting step to obtain a second solution containing a small remaining portion of said sulfuric acid, combining said second solution with an amount of strontium carbonate in a third admixing and reacting step to separate out the said small remaining portion of sulfuric acid, and separating the insolubles from said third reacting step to obtain a third solution containing substantially all the chromium contained in said aqueous slurry and substantially no sulfuric acid from said initial reacting step.

2. A process as recited in claim 1 in which said initial admixing and reacting step is carried otu with a stoichiometric quantity of sulfuric acid.

3. A process as recited in claim 1 in which said second admixing and reacting step is carried out with a stoichiometric quantity of said carbonate.

4. A process as recited in claim 1 in which said carbonate is calcium carbonate.

5. A process as recited in claim 1 in which said third admixing and reacting step is carried out in the presence of an excess of strontium carbonate.

6. A process as recited in claim 1 in which said initial admixing and reacting step is carried out with a stoichiometric quantity of sulfuric acid, said second admixing and reacting step is carried out with a stoichiometric quantity of said carbonate, and said third admixing and reacting step is carried out in the presence of 50 percent or more excess of strontium carbonate.

7. A process as recited in claim 1 in which said separating steps for obtaining said first, second and third solutions is by filtration.

References Cited
UNITED STATES PATENTS

| | | | |
|---|---|---|---|
| 1,857,548 | 5/1932 | Humphries | 23—145 |
| 2,436,940 | 3/1948 | Schulein | 23—145X |
| 2,600,171 | 6/1952 | Sagen | 23—145X |
| 3,371,034 | 2/1968 | Richards | 23—145X |

HERBERT T. CARTER, Primary Examiner

U.S. Cl. X.R.

23—56, 122; 210—53